(12) United States Patent
Svorc

(10) Patent No.: US 9,705,399 B2
(45) Date of Patent: Jul. 11, 2017

(54) ADAPTIVE THRESHOLD OF A ZERO CROSSING COMPARATOR

(71) Applicant: Dialog Semiconductor GmbH, Kirchheim/Teck-Nabern (DE)

(72) Inventor: Jindrich Svorc, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 89 days.

(21) Appl. No.: 14/272,984

(22) Filed: May 8, 2014

(65) Prior Publication Data

US 2015/0318785 A1 Nov. 5, 2015

(30) Foreign Application Priority Data

Apr. 30, 2014 (EP) ..................... 14368022

(51) Int. Cl.
*G05F 1/40* (2006.01)
*H02M 3/158* (2006.01)
*H02M 1/00* (2006.01)

(52) U.S. Cl.
CPC ......... *H02M 3/158* (2013.01); *H02M 3/1588* (2013.01); *H02M 2001/0051* (2013.01);
(Continued)

(58) Field of Classification Search
CPC .... H02M 3/156; H02M 3/158; H02M 3/1588; H02M 2001/0051; H02M 2001/0054;
(Continued)

(56) References Cited

U.S. PATENT DOCUMENTS 5,818,084 A * 10/1998 Williams ............ H01L 27/0727
257/146
6,396,250 B1 5/2002 Bridge
(Continued)

FOREIGN PATENT DOCUMENTS

EP 1639693 3/2006
EP 2214298 8/2010

OTHER PUBLICATIONS

Co-pending U.S. Appl. No. 13/895,575, filed May 16, 2013, "Adaptive low-power zero-cross comparator for Discontinuous Current Mode operated Switching Mode Power Supply," by Jindrich Svorc, et al., 21 pgs.
(Continued)

*Primary Examiner* — Alex Torres-Rivera
(74) *Attorney, Agent, or Firm* — Saile Ackerman LLC; Stephen B. Ackerman

(57) ABSTRACT

A buck converter device with a zero-cross comparator with an adaptive threshold. The buck converter comprises of a control block that controls a first p-channel MOSFET switch, and a second n-channel MOSFET switch. The p-channel MOSFET switch and the n-channel MOSFET switch provide a sense signal utilizing parasitic bipolar junction transistors. The p-channel MOSFET provides a sense current for the pnp parasitic bipolar junction transistor, The n-channel MOSFET provides a sense current for the npn parasitic bipolar junction transistor. The sense current is stored on a capacitor, and establishes an adaptive offset adjustment to a zero-cross comparator.

27 Claims, 8 Drawing Sheets

(52) U.S. Cl.
CPC .. *H02M 2001/0054* (2013.01); *Y02B 70/1466* (2013.01); *Y02B 70/1491* (2013.01)

(58) Field of Classification Search
CPC . H02M 1/083; Y02B 70/1466; Y02B 70/1491
USPC ........ 323/225, 282, 283, 284, 285, 235, 319
See application file for complete search history.

(56) References Cited

U.S. PATENT DOCUMENTS

| | | | |
|---|---|---|---|
| 6,444,510 B1 | 9/2002 | Hu et al. | |
| 6,472,712 B1* | 10/2002 | Nakura | H01L 21/76264 257/347 |
| 7,446,513 B2 | 11/2008 | Dikken et al. | |
| 7,570,038 B2 | 8/2009 | Yang | |
| 7,570,118 B1* | 8/2009 | Gaboriau | H03F 1/523 330/10 |
| 2007/0080674 A1* | 4/2007 | Gray | H02M 3/1588 323/282 |
| 2008/0298106 A1* | 12/2008 | Tateishi | H02M 3/1588 363/127 |
| 2009/0154035 A1* | 6/2009 | Galvano | H02H 9/046 361/56 |
| 2010/0194371 A1 | 8/2010 | Satou et al. | |
| 2010/0271742 A1* | 10/2010 | Shannon | G01R 31/002 361/56 |
| 2014/0062436 A1* | 3/2014 | Lenz | G05F 1/46 323/282 |
| 2015/0115920 A1* | 4/2015 | Kruiskamp | H02M 3/156 323/282 |

OTHER PUBLICATIONS

"A Low-Voltage CMOS DC-DC Converter for a Portable Battery-Operated System," by Anthony J. Stratakos, et al., Power Electronics Specialists Conference, PESC '94 Record., 25th Annual IEEE , pp. 619-626, Jun. 1994.

"Robust and Efficient Synchronous Buck Converter with near-Optimal Dead-Time Control," by Sungwoo Lee, et al., ISSCC 2011 / Session 22 / DC/DC Converters / 22.6, IEEE International Solid-State Circuits Conference, Feb. 23, 2011, pp. 392-394.

European Search Report 14368022.1-1809, Dec. 10, 2014, Dialog Semiconductor GmbH.

* cited by examiner

ADAPTIVE THRESHOLD OF A ZERO CROSSING COMPARATOR

RELATED PATENT APPLICATION

This application is related to, Ser. No. 13/895,575, filed on May 16, 2013, assigned to a common assignee, and which is herein incorporated by reference in its entirety.

BACKGROUND

Field

The disclosure relates generally to power supply circuits and methods and, more particularly, to buck type converters with a zero-cross comparator, circuit and a method thereof.

Description of the Related Art

Switching Mode Power Supply (SMPS) converter power supply stage and low dropout (LDO) regulators are a type of voltage regulators used in conjunction with semiconductor devices, integrated circuit (IC), battery chargers, and other applications. Low dropout regulators (LDO) can be used in digital, analog, and power applications to deliver a regulated supply voltage.

An example of known to the inventor, a Switching Mode Power Supply (SMPS) converter power stage including a zero-cross comparator is shown in FIG. 1. The SMPS converter 10 has an output signal VOUT 20, and a ground connection 30. The output stage comprises of a series. inductor 40, an output capacitor Cout 50, and resistor load Rload 60. A series PMOS switch 70 has a control network 75, and a second NMOS switch 80 has a control network 85. A zero cross comparator 90 has inputs connected across the NMOS switch 80.

The control circuit (not shown) provides the control signals for two switches which are in this case realized as PMOS 70 and NMOS 80 transistors. The operation is in Discontinuous Conduction Mode (DCM). In some buck converter designs, the buck works at a fixed switching frequency. Each clock cycle starts with turning the PMOS 70 on and charging the coil during the $t_r$ time. Then the PMOS is turned off and the NMOS 80 is turned on instead. In this moment the control circuit is waiting for output of zero-crossing comparator ZC 90. This comparator triggers when the current in the coil reaches zero level. At this moment the NMOS 80 is turn off and no current through the coil is flowing. The control circuit (not shown) is waiting for next clock signal to start next switching period. The control circuit (not shown) provides the control signals for two switches which are in this case realized as PMOS and NMOS transistors.

FIG. 2 shows the timing diagram 200 for the circuit described in FIG. 1. The buck works at a fixed switching frequency. Each clock cycle starts with turning the PMOS 210 on and charging the coil during the $t_r$ time. Then the PMOS 210 is turned off and the NMOS 220 is turned on instead. The OFF state 230, inductor current IL 240, node voltage VLX 250 and zero-crossing comparator 260 are also shown in the timing diagram. In this moment the control circuit is waiting for output of zero-crossing comparator ZC 260. This comparator triggers when the current in the coil reaches zero level. At this moment the NMOS is turn off and no current through the coil is flowing. The control circuit is waiting for next clock signal to start next switching period. From the description above the importance of the zero-crossing comparator is obvious. An ideal NMOS turning off is shown in FIG. 2—period A. Two possible malfunctions of the zero-crossing comparator are shown in periods B and C.

If the NMOS is turn off too late, as is depicted in period B, the current in the coil goes negative and the voltage on LX node has to go above the VIN, turns on the parasitic diode in the PMOS and push the charge in to the VIN till the coil current reach zero. This is the worst response because the higher drop on the parasitic diode increases power consumption and decreases valuable efficiency of the converter and the current is actually taken from the output and pushed back in to the input.

On the other side, if the NMOS is turned off too early, as is depicted in part C, the current in the coil goes through the parasitic diode of the NMOS transistor which increases losses because the voltage across the diode is higher than the voltage across NMOS in 'on' state. Hence, the more precise turning off the NMOS the better efficiency is achieved.

The above described circuit of FIG. 1 has some undesirable response features. First, the standard zero-crossing comparator evaluates a small input voltage, requiring design complexity and a non-simple design solution. Additionally, special techniques to minimize the offset exist. For improvement, trimming is usually required. Strict requirements also exist for the comparator. The comparator must be sufficiently fast which leads to higher power consumption. Additionally, the comparator is connected to very noisy circuit and system nets which make the design implementation even more difficult.

U.S. Pat. No. 6,396,250 to Bridge, describes a control method to reduce body diode conduction and reverse recovery losses. A DC-to-DC converter to convert a first DC voltage to a second DC voltage includes a first switch connected to input the first DC voltage, a second switch, the first switch and the second switch being controlled by an input signal to generate the second DC voltage, the first switch and the second switch being connected to a control reference, and a control circuit to control the delay of the input signal by monitoring the control reference around an optimal delay point.

European Patent EP 1,639,693 to Dikken et al., describes dead time control in a switching circuit. A switching circuit where adjustment means adjust the length of the dead time period based on a voltage difference is described.

U.S. Pat. No. 7,570,038 to Yang, describes a control circuit to reduce reverse current of synchronous rectifier, This describes a circuit which minimizes the reverse current in a power control circuit.

European Patent EP 2,214,298 to Satou et al., describes a DC-DC converter and switch control circuit. A dc-to-dc converter has a means of controlling the transition time between the on-state and off-state of the network.

In these embodiments, the solutions to improve the response of a buck converter, and more specifically utilize various means to address transitioning and dead time is discussed.

SUMMARY

It is desirable to provide a solution to that achieves lower power consumption of a zero-cross comparator, where the zero-cross comparator senses a smaller differential signal.

It is desirable to provide a solution which provides an improved whole system efficiency by reduction of the quiescent current.

It is desirable to provide a solution which provides improved whole system noise immunity.

It is desirable to provide a solution which does not require trimming of the zero-crossing comparator by the adaptive loop.

A principal object of the present disclosure is to provide a solution where the Switching Mode Power Supply (SMPS) topology is unchanged.

Another further object of the present disclosure is to provide a solution for a buck converter where the voltage control loop is unchanged.

Also in accordance with the object of the present disclosure, the zero-cross comparator has lower power consumption with a higher offset and delay.

The above and other objects are achieved by sensing the current in parasitic diodes through bipolar junction transistors (BJTs).

The above and other objects are achieved by sensing the current in parasitic diodes through auxiliary metal oxide semiconductor field effect transistors (MOSFETs).

The above and other objects are achieved by defining a simple circuit which generates a control signal for adaptive adjustment of the comparison level and/or delay of the zero-cross comparator in order to achieve the best efficiency.

The above and other objects are further achieved by a method of how to measure behavior of the zero-cross comparator including the delay in the logic and drivers at specified time.

The above and other objects are further achieved by a method of utilizing the parasitic diode structures inside the NMOS and PMOS switch elements.

The above and other objects are further achieved by a method of utilizing the parasitic diode structures in auxiliary MOSFETs.

The above and other objects are further achieved by sensing substrate currents from the buck converter n-channel MOSFET and p-channel MOSFET and using these in an adaptive comparator system in a discontinuous conduction mode (DCM) buck converter to adjust the n-channel MOSFET switch-off time to achieve zero-current switching to minimize losses caused by inductor current being forced across voltage drops in the parasitic diodes in the PMOS and NMOS.

The above and other objects are also achieved by a buck converter device comprising a first switch device with a first parasitic bipolar junction transistor configured to provide a first sense signal, a second switch device with a second parasitic bipolar junction transistor configured to provide a second sense signal, and a zero-cross comparator with an adaptive threshold configured with an offset and/or delay adjustment provided from said first sense signal, and said second sense signal.

The above and other objects are also achieved by a voltage converter device comprising a first switch device with a first parasitic bipolar junction transistor configured to provide a first sense signal, a second switch device with a second parasitic bipolar junction transistor configured to provide a second sense signal, a capacitor providing charge storage for said first sense signal, and said second sense signal, a zero-cross comparator with an adaptive threshold and/or delay whose first and second input are electrically connected to said second switch device, a feedback loop electrically connected to said capacitor configured to provide an offset adjustment for said zero-cross comparator, and, a control block configured to provide electrical controls for said first switch device, and said second switch device configured to provide an input signal comprises of an adaptive threshold signal from said zero-cross comparator.

The above and other object are also achieved by a method of adaptive threshold control for a zero-cross comparator comprising the steps (A) providing a buck converter comprising a first MOSFET switch with a first parasitic bipolar transistor, an second MOSFET switch with a second parasitic bipolar transistor, a sense capacitor element, a zero-cross comparator, an offset adjustment feedback loop, a control block, an inductor, and a output capacitor, (B) sensing a signal from said first parasitic transistor, (C) sensing a signal from said second parasitic transistor, (D) storing a sense signal on said sense capacitor element, (E) providing a sense signal to said offset adjustment feedback loop, (F) adjusting the zero-cross comparator response from said sense signal, and (G) generating an output signal from said zero-cross comparator to said control block.

As such, a novel Switching Mode Power Supply (SMPS) converter power stage including a zero-cross comparator novel buck converter with improved mode of operation is described. Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DETAILED DESCRIPTION

Figure 1:
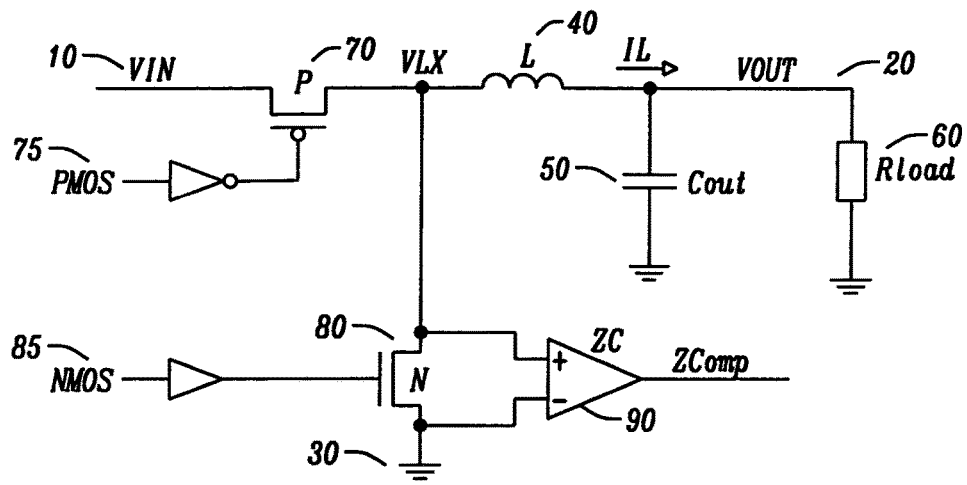
FIG. 1 is a circuit schematic diagram illustrating an embodiment known to the inventor of a Switching Mode Power Supply (SMPS) with zero-crossing comparator.
Figure 2:
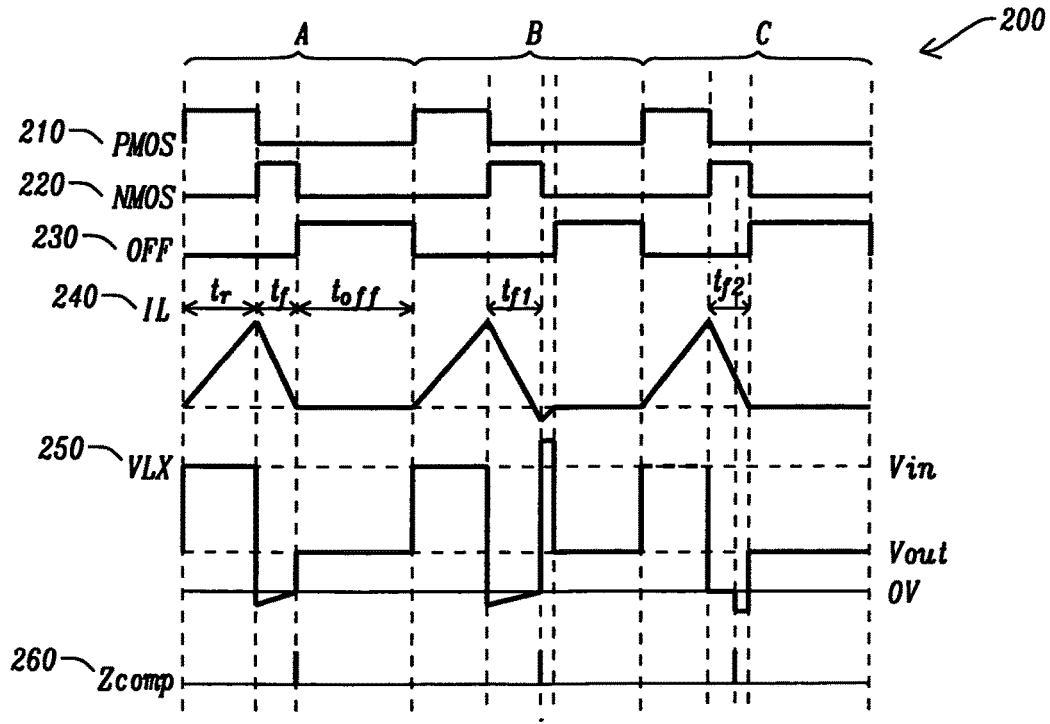
FIG. 2 is a plot of the timing diagram for a Buck converter in discontinuous conduction mode (DCM)
Figure 3:
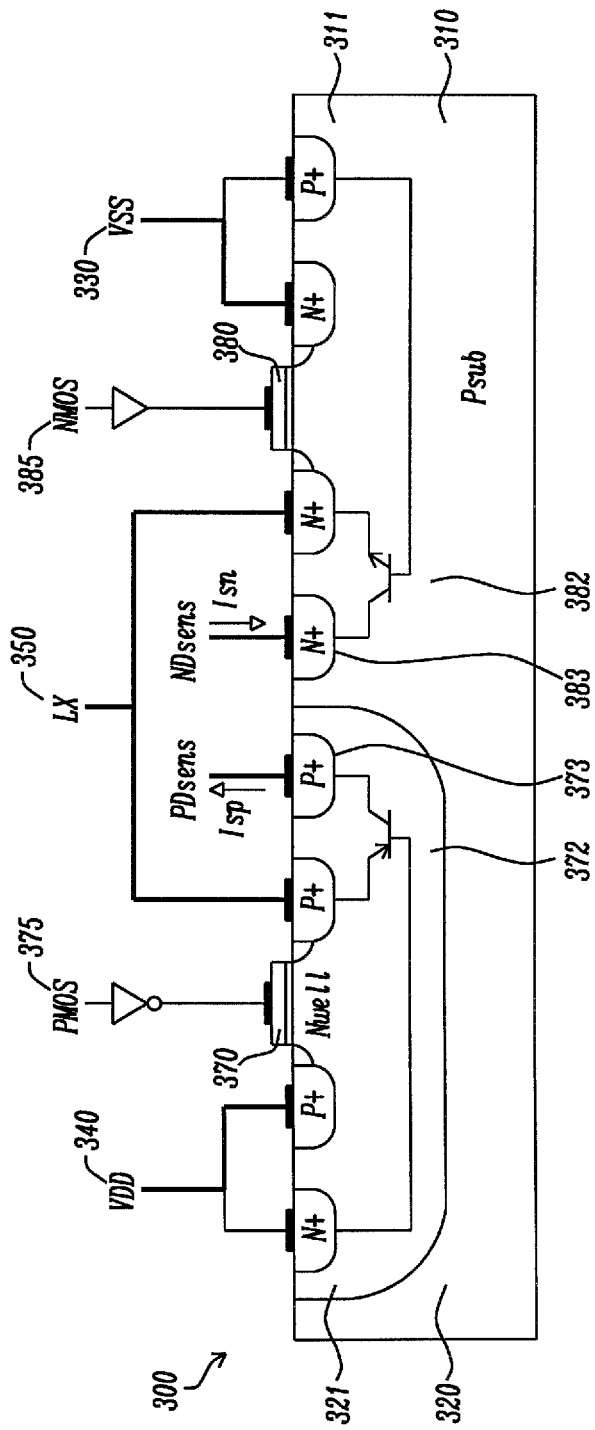
FIG. 3 is a cross section of the PMOS and NMOS switch with parasitic bipolar transistors in accordance with a first embodiment of the disclosure.

FIG. 3 is a cross section of the PMOS and NMOS switch with parasitic bipolar transistors in accordance with a first embodiment of the disclosure. The cross section 300 describes the switches and parasitic elements for sensing. The sensing p- substrate and n-well currents from the buck converter n-channel MOSFET and p-channel MOSFET and using these in an adaptive comparator system in a DCM buck converter are used to adjust the n-channel MOSFET switch-off time to achieve zero-current switching to minimize losses caused by inductor current being forced across voltage drops. The substrate contact P+ 311 is contained within the p-type substrate (PSUB) 310. The n-well contact N+ 321 is contained within the N-well region 320. The substrate power rail VSS 330 is electrically connected to the p-type substrate (PSUB) 310. The power supply rail VDD 340 is electrically connected to the n-type Nwell 320. The PMOS transistor switch 370 is contained within the N-well 320. The NMOS transistor switch 380 is electrically contained within the p-type substrate Psub 310. The PMOS switch 370 is driven by the PMOS control 375. The NMOS switch 380 is driven by the NMOS control 385. The PMOS switch 370 and NMOS switch 380 are electrically connected to signal LX 350 providing a voltage VLX.

A sensing pnp parasitic bipolar transistor 372 is formed within the N-well 320 between the drain of the PMOS transistor switch 370 and an additional P+ diffusion 373. A sensing npn parasitic bipolar transistor 382 is formed within the Psub 310 between the drain of the NMOS transistor switch 380 and an additional N+ diffusion 383. A sensing signal PDsens is established from the P+ diffusion 373 which acts as a collector of the parasitic pnp. A sensing signal NDsens is established from the N+ diffusion 383 which acts as a collector for the parasitic npn.

In this disclosure, a key feature includes how to measure whether the zero-crossing comparator including all the delay in the logic and drivers acts at the right time. The NMOS switch 380 is turned off precisely when the current in the coil reach zero amps. This is actually done by measuring the current in the parasitic diodes inside the NMOS and PMOS switch. One of these diodes takes-over the current when both the MOSFETs are turned off. Which diode takes the current over depends on the direction of the current in the coil. If the current flows from the source to the load (positive coil current) the NMOS parasitic diode is taking the current when both switches are turned off and similarly PMOS parasitic diode acts in the same way when the coil current has opposite direction (negative coil current).

The diodes are usually created by P+ to N-well junction in case of PMOS and by N+ to Psub (or isolated PWELL) junction in case of NMOS. By creating some suitable collector diffusion somewhere near by these diodes, the diodes become emitter—base junctions of bipolar transistors (BJT). The new diffusions are collectors of the parasitic transistor. With right bias, the collector current through the transistor is proportional to the current through the diode and can be used for the adaptive feedback which adjusts the zero-comparator towards right timing.

In case of positive coil current the current flows from the VSS-P+-Psub through the Psub N+ junction to N+ to the LX node, which is below VSS now. The LX diffusion N+ acts as an emitter and the near N+ diffusion creates collector. If the collector voltage of the BJT is positive, the collector current Isn is proportional to the current in the parasitic diode with coefficient given by bipolar current gain ($\beta$) of the parasitic BJT and ratio of the area of adjacent emitter and collector N+ diffusions. The same principle is applicable for the PMOS side. FIG. 3 shows an example of a PMOS and NMOS switch in a single well technology. The implementation can be utilized in a dual-well or triple-well technology. The dual well technology forms a p-well in the p-substrate. The triple well technology allows for isolation of the NMOS transistor in a isolated p-well region. With the utilization of triple well technology with isolated NMOS transistors, the injection currents can be separated from other minority carrier injection, leakage and other non-desired injection mechanisms. With isolated transistors, this parasitic bipolar junction transistor (BJT) sense approach would be less sensitive to substrate currents (e.g. from other converters) and leakages at elevated junction temperatures.

Figure 4:
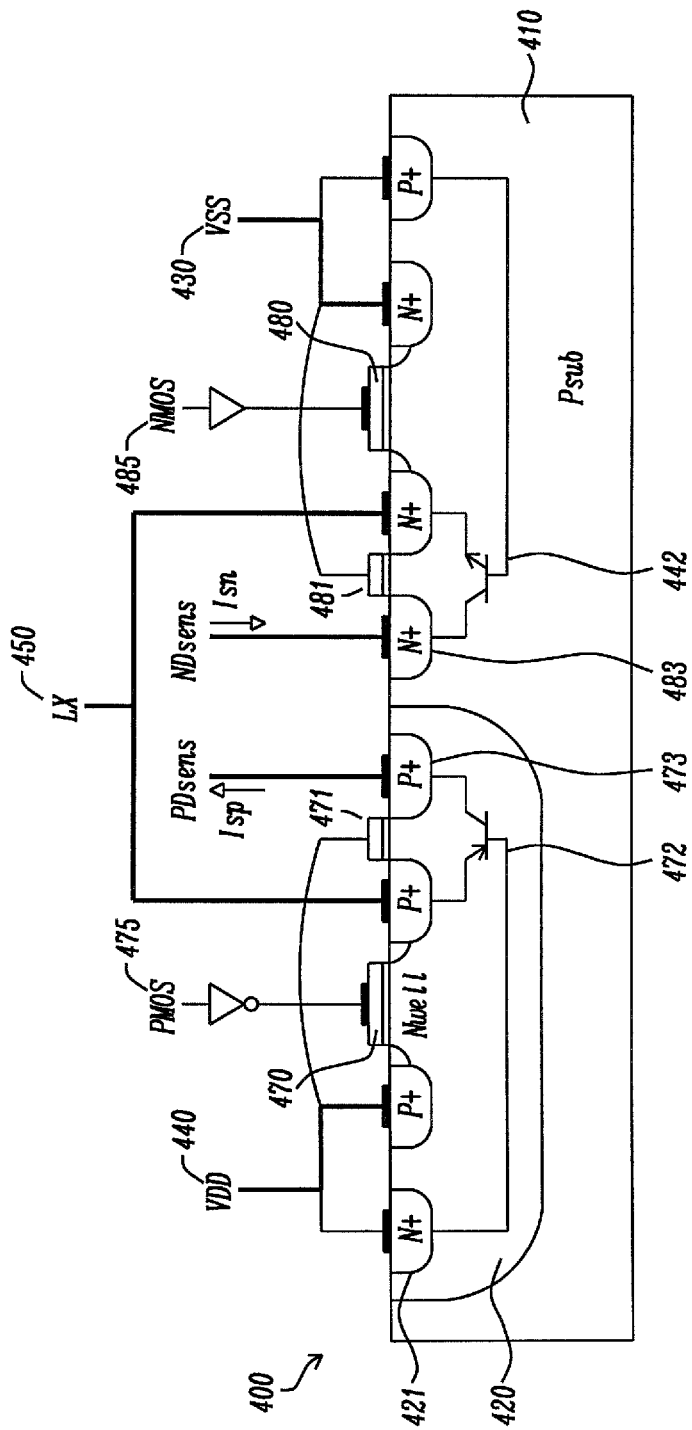
FIG. 4 is a cross section of the PMOS and NMOS switch with auxiliary MOSFET devices in accordance with a second embodiment of the disclosure.

FIG. 4 is a cross section of the PMOS and NMOS switch with auxiliary MOSFET devices in accordance with a second embodiment of the disclosure. A second embodiment structure utilizes auxiliary devices that are simple MOSFET devices instead of the bipolar structure. The smaller 'sensing' auxiliary MOSFETs still have the parasitic BJTs inbuilt inside their structure but the additional current is taken over by the small MOS structure. The cross section 400 describes the switches and parasitic elements for sensing. The substrate contact P+ 411 is contained within the p-type substrate (PSUB) 410. The n-well contact N+ 421 is contained within the N-well region 420. The substrate power rail VSS 430 is electrically connected to the p-type substrate (PSUB) 410. The power supply rail VDD 440 is electrically connected to the n-type Nwell 420. The PMOS transistor switch 470 is contained within the N-well 420. The NMOS transistor switch 480 is electrically contained within the p-type substrate Psub 410. The PMOS switch 470 is driven by the PMOS control 475. The NMOS switch 480 is driven by the NMOS control 485. The PMOS switch 470 and NMOS switch 480 are electrically connected to signal LX 450 providing a voltage VLX.

A sensing pnp parasitic bipolar transistor 472 is formed within the N-well 420 between the PMOS transistor switch 470 and an additional P+ diffusion 473. The auxiliary sensing p-type MOSFET 471 is formed from the PMOS transistor switch 470 and the additional P+ diffusion 473 and its gate is electrically connected to Vdd 440. A sensing npn parasitic bipolar transistor 482 is formed within the Psub 410 between the NMOS transistor switch 480 and an additional N+ diffusion 483 and its gate is electrically connected to VSS. The auxiliary sensing n-type MOSFET 481 is formed from the NMOS transistor switch 480 and additional N+ diffusion 483. A sensing signal PDsens 471 is established from the P+ diffusion 473. A sensing signal NDsens 481 is established from the N+ diffusion 483. FIG. 4 shows an example of a PMOS and NMOS switch and auxiliary sensing devices in a single well technology. The implementation can be utilized in a dual-well or triple-well technology. The dual well technology forms a p-well in the p-substrate. The triple well technology allows for isolation of the NMOS transistor in a isolated p-well region. With the utilization of triple well technology with isolated NMOS transistors, the injection currents can be separated from other minority carrier injection, leakage and other non-desired injection mechanisms. With isolated transistors, this parasitic bipolar junction transistor (BJT) sense approach would be less sensitive to substrate currents (e.g. from other converters) and leakages at elevated junction temperatures.

Figure 5:
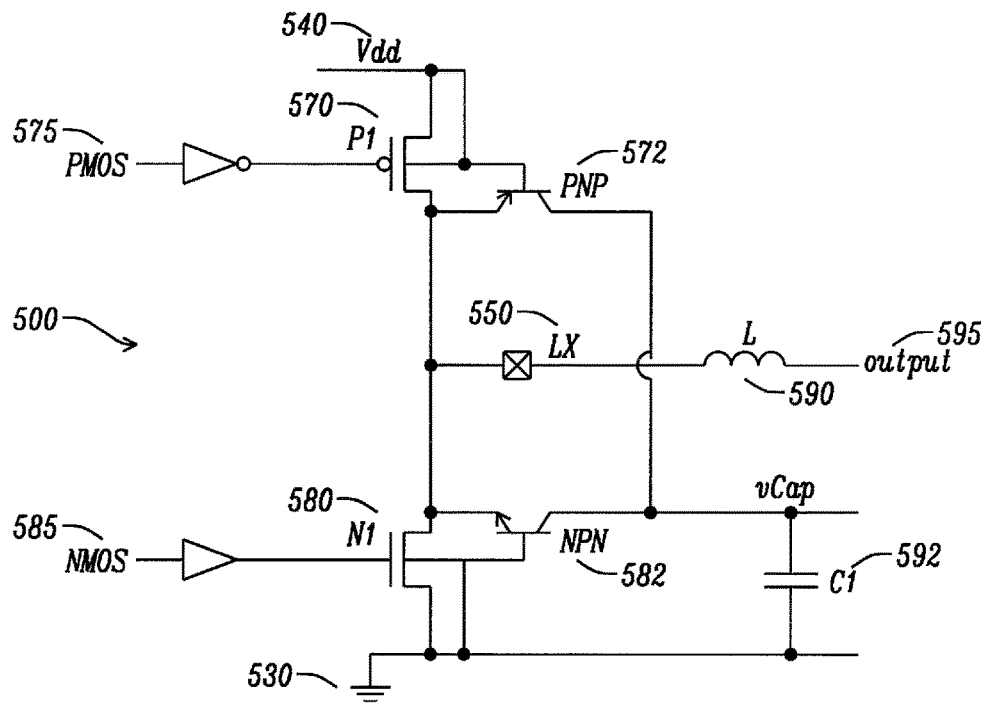
FIG. 5 a circuit schematic diagram of a Switching Mode Power Supply (SMPS) with zero-crossing comparator with parasitic bipolar transistors in accordance with a first embodiment of the disclosure.

FIG. 5 a circuit schematic diagram of a Switching Mode Power Supply (SMPS) with zero-crossing comparator with parasitic bipolar transistors in accordance with a first embodiment of the disclosure. FIG. 5 shows the circuit 500. The circuit 500 contains a ground rail VSS 530 and power supply rail Vdd 540. The substrate power rail VSS 530 is electrically connected to the p-type substrate. The power supply rail Vdd 540 is electrically connected to the n-type N-well. The PMOS transistor switch 570 is electrically connected to power supply 540. The NMOS transistor switch 580 is electrically connected to the substrate ground rail 530. The PMOS switch 570 is driven by the PMOS control 575. The NMOS switch 580 is driven by the NMOS control 585. The PMOS switch 570 and NMOS switch 580 are electrically connected to signal LX 550 providing a voltage VLX. The output signal 595 is electrically connected to a series inductor 590.

A sensing pnp parasitic bipolar transistor 572 is formed between the PMOS transistor switch 570 and the N-well and an additional P+ diffusion. A sensing npn parasitic bipolar transistor 582 is formed between the NMOS transistor switch 580 and PSUB 310 and an additional N+ diffusion.

The outputs of the sensing bipolar transistor PNP 572 and NPN 582 is used to create a signal which is used for adjusting the trigger point of the zero-crossing comparator afterwards. The simple solution is to put these nodes together and connect them to the capacitor element C1 592.

The operation of the circuit 500 of a Switching Mode Power Supply (SMPS) with zero-crossing comparator with parasitic bipolar transistors in accordance with a first embodiment of the disclosure can be understood from the following cases:

Case (A) If the NMOS N1 580 is turned off exactly at the time when the current in the coil 590 connected to LX node 550 is equal zero there is no current flowing through any of the parasitic diode, neither through PMOS nor NMOS. In this case the voltage of the cap C1 592 stays at its value and no change is observed.

Case (B) If the NMOS N1 580 is turned off too late the negative current is taken over by the PMOS parasitic diode, which act as an emitter of the PNP and some current flows through the PNP into the C1 592 which increases the voltage of the vCap node.

Case (C) If the NMOS N1 580 is turned off too early the positive current from the coil 590 is taken over by the NMOS parasitic diode, which acts as an emitter of the NPN and some current flows through from the C1 592 to the NPN into ground which decreases the voltage of the vCap node.

Figure 6:
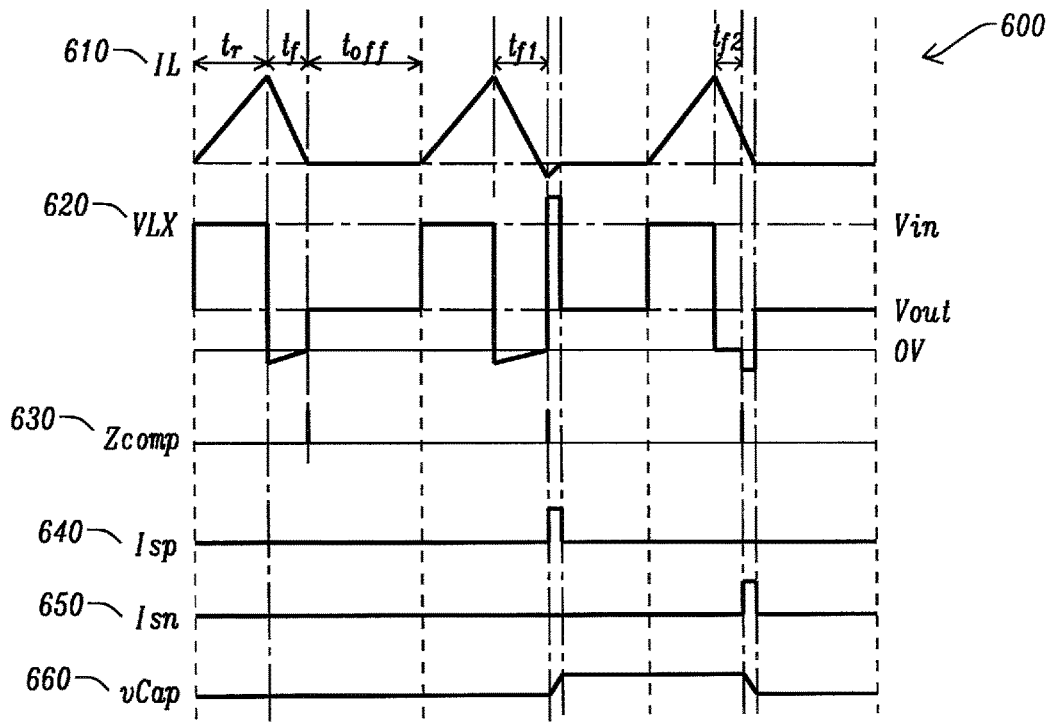
FIG. 6 is a timing diagram of a Switching Mode Power Supply (SMPS) with zero-crossing comparator with parasitic bipolar transistors in accordance with a first embodiment of the disclosure.

FIG. 6 is a timing diagram of a Switching Mode Power Supply (SMPS) with zero-crossing comparator with parasitic bipolar transistors in accordance with a first embodiment of the disclosure. The timing diagram 600 shows the circuit response with the inductor current 610, LX node voltage VLX 620, the signal of the zero-cross comparator 630, the sense current Isp 640, the sense current Isn 650, and the voltage on the capacitor 660.

Figure 7:
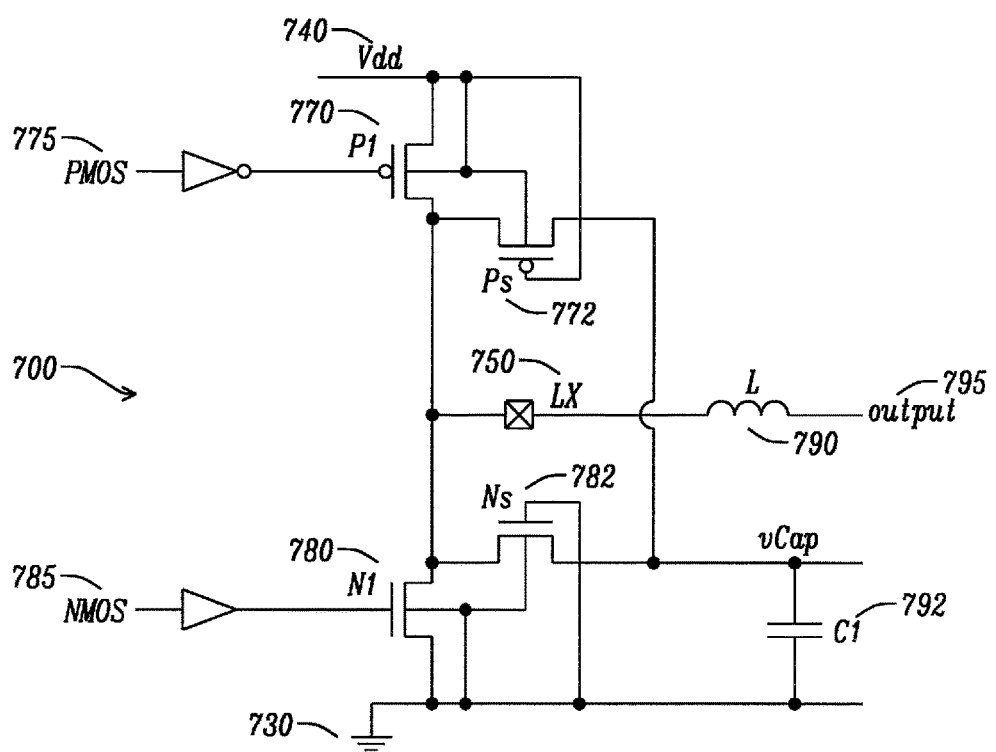
FIG. 7 a circuit schematic diagram of a Switching Mode Power Supply (SMPS) with zero-crossing comparator with auxiliary MOSFETs in accordance with a second embodiment of the disclosure.

FIG. 7 a circuit schematic diagram of a Switching Mode Power Supply (SMPS) with zero-crossing comparator with auxiliary MOSFETs in accordance with a second embodiment of the disclosure. FIG. 7 shows the circuit 700. The circuit 700 contains a ground rail VSS 730 and power supply rail Vdd 740. The substrate power rail VSS 730 is electrically connected to the p-type substrate. The power supply rail Vdd 740 is electrically connected to the n-type Nwell. The PMOS transistor switch 770 is electrically connected to power supply 740. The NMOS transistor switch 780 is electrically connected to the substrate ground rail 730. The PMOS switch 770 is driven by the PMOS control 775. The NMOS switch 780 is driven by the NMOS control 785. The PMOS switch 770 and NMOS switch 780 are electrically connected to signal LX 750 providing a voltage VLX. The output signal 795 is electrically connected to a series inductor 790.

A sensing p-type MOSFET PMOS Ps 772 is formed between the PMOS transistor switch 570 and an additional P+ diffusion, and MOSFET gate structure. A sensing n-type MOSFET Ns 782 is formed between the NMOS transistor switch 780, an additional N+ diffusion, and MOSFET gate structure.

The outputs of the sensing MOSFET Ps 772 and MOSFET Ns 782 is used to create a signal which is used for adjusting the trigger point of the zero-crossing comparator afterwards. The simple solution is to put these nodes together and connect them to the capacitor element C1 792.

The operation of the circuit 700 of a Switching Mode Power Supply (SMPS) with zero-crossing comparator with parasitic bipolar transistors in accordance with a second embodiment of the disclosure can be understood from the following cases:

Case (A) If the NMOS N1 780 is turned off exactly at the time when the current in the coil 790 connected to LX node 750 is equal zero there is no current flowing through any of the parasitic diode, neither through PMOS nor NMOS. In this case the voltage of the cap C1 792 stays at its value and no change is observed.

Case (B) If the NMOS N1 780 is turned off too late the negative current is taken over by the PMOS parasitic diode, which act as an emitter of the PNP and some current flows through the PNP into the C1 792 which increases the voltage of the vCap node.

Case (C) If the NMOS N1 780 is turned off too early the positive current from the coil 790 is taken over by the NMOS parasitic diode, which acts as an emitter of the NPN and some current flows through from the C1 792 to the NPN into ground which decreases the voltage of the vCap node.

Figure 8:
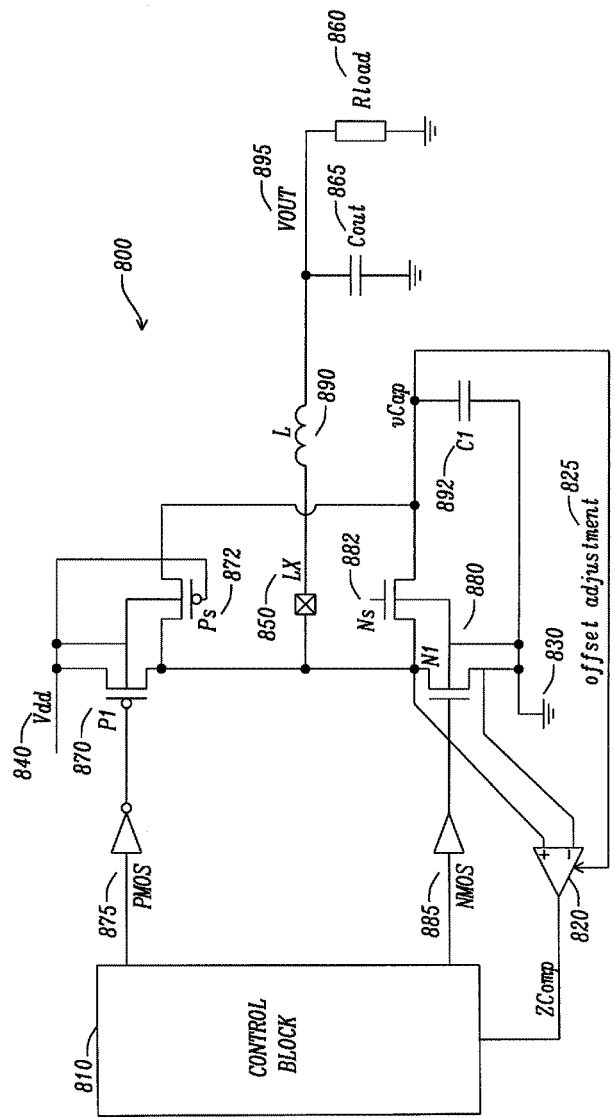
FIG. 8 a circuit schematic diagram of the overall system of a control block, and a Switching Mode Power Supply (SMPS) with zero-crossing comparator with auxiliary MOSFETs in accordance with a second embodiment of the disclosure.

FIG. 8 a circuit schematic diagram of the overall system of a control block, and a Switching Mode Power Supply (SMPS) with zero-crossing comparator with auxiliary MOSFETs in accordance with a second embodiment of the disclosure. The system works in discontinues conducting mode and the voltage in vCap controls the offset in the simple zero crossing comparator. The vCap voltage keeps changing towards its ideal point where the diodes are not conducting and the power losses are the lowest.

FIG. 8 shows the circuit 800. The circuit contains a control block 810, a zero-cross comparator 820 and feedback offset adjustment loop 825. The circuit 800 contains a ground rail VSS 830 and power supply rail Vdd 840. The substrate power rail VSS 830 is electrically connected to the p-type substrate. The power supply rail Vdd 840 is electrically connected to the n-type Nwell. The PMOS transistor switch 870 is electrically connected to power supply 840. The NMOS transistor switch 880 is electrically connected to the substrate ground rail 830. The PMOS switch 870 is driven by the PMOS control 875. The NMOS switch 880 is driven by the NMOS control 885. The PMOS switch 870 and NMOS switch 880 are electrically connected to signal LX 850 providing a voltage VLX. The output signal 895 is electrically connected to a series inductor 890 followed by output capacitor Cout 865, and resistor load Rload 860.

A sensing p-type MOSFET PMOS Ps 872 is formed between the PMOS transistor switch 870 and an additional P+ diffusion, and MOSFET gate structure. A sensing n-type MOSFET Ns 882 is formed between the NMOS transistor switch 880, an additional N+ diffusion, and MOSFET gate structure. The outputs of the sensing MOSFET Ps 872 and MOSFET Ns 882 are used to create a signal which is used for adjusting the trigger point of the zero-crossing comparator afterwards. The simple solution is to put these nodes together and connect them to the capacitor element C1 892, and establish a signal offset adjustment 825 fed into zero-cross comparator 820. The positive and negative inputs into the zero-cross comparator 820 are established from drain and source of NMOS N1 880.

Figure 9:
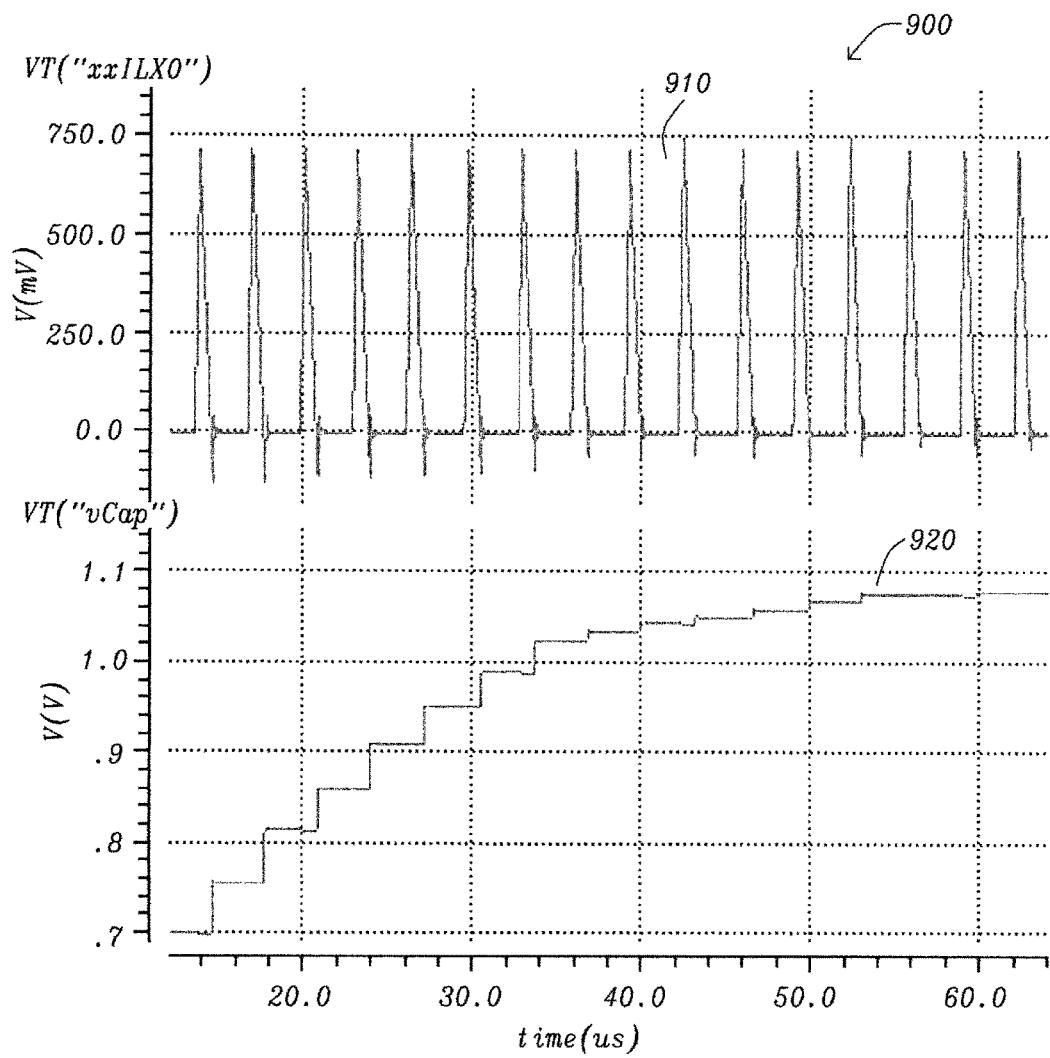
FIG. 9 is simulation results of the capacitor voltage and the coil current of the overall system of a control block and a Switching Mode Power Supply (SMPS) in accordance with a second embodiment of the disclosure; and, FIG. 10 is a methodology flow for a voltage converter with an adaptive threshold for a zero-cross comparator.

FIG. 9 is simulation results of the capacitor voltage and the coil current of the overall system of a control block and a Switching Mode Power Supply (SMPS) in accordance with a second embodiment of the disclosure. The simulation results 900 include the coil current 910 and capacitor voltage 920 as a function of time. The simulation results 900 of the circuit are shown in FIG. 9. The vCap node voltage 920 is increasing due to wrong timing of the zero-crossing comparator and the undershoot of the coil current 910 is ceasing.

Additional small DC current can be added on top of the currents from the bipolar junction transistors (BJTs) which moves the offset towards selected direction, usually to get the turning off of the NMOS switch a bit earlier. It assures no negative current flowing through the PMOS switch. This situation is better than if there is a current from the output to the input, mainly because of efficiency reasons.

Figure 10:
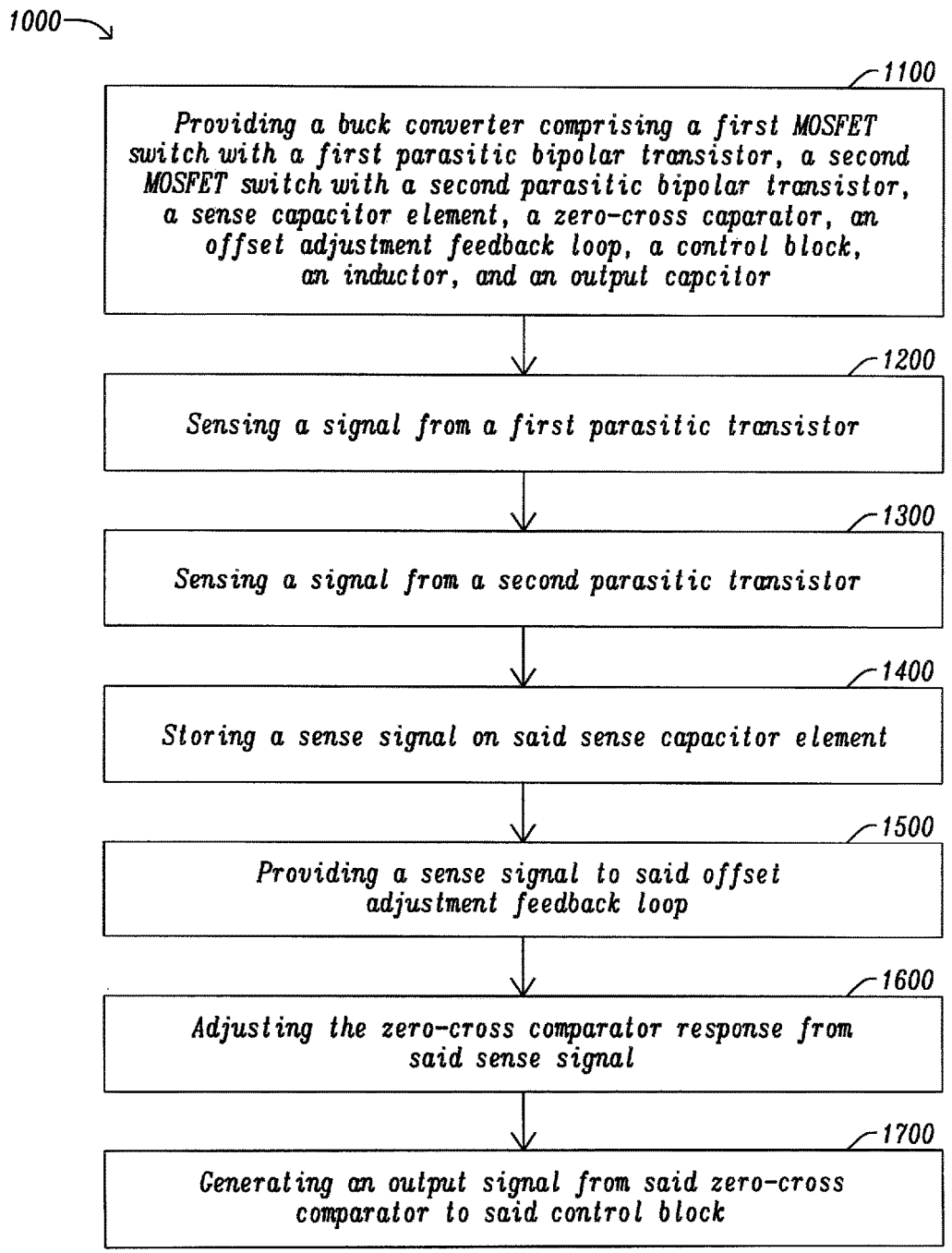

FIG. 10 is a methodology flow 1000 for a method of adaptive threshold control for a zero-cross comparator comprising the steps: providing a buck converter comprising a first MOSFET switch with a first parasitic bipolar transistor, a second MOSFET switch with a second parasitic bipolar transistor, a sense capacitor element, a zero-cross comparator, an offset adjustment feedback loop, a control block, an inductor, and an output capacitor 1100, sensing a signal from said first parasitic transistor 1200, sensing a signal from said second parasitic transistor 1300, storing a sense signal on said sense capacitor element 1400, providing a sense signal to said offset adjustment feedback loop 1500, adjusting the zero-cross comparator response from said sense signal 1600, and, generating an output signal from said zero-cross comparator to said control block 1700.

As such, a novel buck converter with a modified zero-crossing comparator utilizing parasitic bipolar transistors sense devices are herein described. Other advantages will be recognized by those of ordinary skill in the art.

The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A buck converter device comprising:
a high-side switch device with a first parasitic bipolar junction transistor configured to provide a first sense signal depending from a current flowing through the first parasitic bipolar junction transistor to a zero-cross comparator;
a low-side switch device with a second parasitic bipolar junction transistor configured to provide a second sense signal depending from current flowing through the second parasitic bipolar junction transistor to the zero-cross comparator;
a sense capacitive element, wherein a first terminal of the sense capacitive element is connected to ground and a second terminal of the sense capacitive element is connected to the zero-cross comparator, directly connected to a collector of the first parasitic bipolar junction transistor and directly connected to a collector of the second parasitic bipolar junction transistor, wherein the sense capacitive element is configured to provide an offset adjustment from said first and second sense signals combined to the zero-cross comparator; and the zero-cross comparator with an adaptive threshold configured with the offset adjustment provided from said first sense signal and said second sense signal combined via said sense capacitive element.

2. The buck converter of claim 1, wherein said high-side switch device is a p-channel MOSFET device and said low-side switch device is an n-channel MOSFET.

3. The buck converter of claim 2, wherein said first parasitic bipolar junction transistor is a pnp bipolar transistor.

4. The buck converter of claim 3, wherein said second parasitic bipolar junction transistor is a npn bipolar transistor.

5. The buck converter of claim 4, wherein said first parasitic bipolar junction transistor comprises a drain of said p-channel MOSFET, an n-well and a p-diffusion.

6. The buck converter of claim 5, wherein said second parasitic bipolar junction transistor comprises a drain of said n-channel MOSFET, a p-substrate, and an n-channel diffusion.

7. The buck converter of claim 2, wherein a first auxiliary p-channel MOSFET comprises said first parasitic bipolar junction transistor within said first auxiliary p-channel MOSFET.

8. The buck converter of claim 7, wherein a second auxiliary p-channel MOSFET comprises said second parasitic bipolar junction transistor within said first auxiliary n-channel MOSFET.

9. A voltage converter device comprising:
a high-side switch device with a first parasitic bipolar junction transistor configured to provide a first sense signal depending from a current flowing through the first parasitic bipolar junction transistor to a zero-cross comparator;
a low-side switch device with a second parasitic bipolar junction transistor configured to provide a second sense signal depending from a current flowing through the second parasitic bipolar junction transistor to the zero-cross comparator;
a sense capacitive element configured to provide charge storage for said first sense signal, and said second sense signal, wherein a first terminal of the sense capacitive element is connected to ground and a second terminal of the sense capacitive element is connected to the zero-cross comparator, directly connected to a collector of the first parasitic bipolar junction transistor and directly connected to a collector of the second parasitic bipolar junction transistor, and to a collector of the second parasitic bipolar junction transistor, wherein the sense capacitive element is configured to provide an offset adjustment from said first and second sense signals combined to the zero-cross comparator;
the zero-cross comparator with an adaptive threshold whose first and second input are electrically connected to a drain and a source of said low-side switch device;
a feedback loop electrically connected to said capacitive element configured to provide the offset adjustment for said zero-cross comparator; and,
a control block configured to provide electrical controls for said high-side switch device and said low-side switch device.

10. The voltage converter of claim 9, wherein said high-side switch device is a p-channel MOSFET device and said low-side switch device is an n-channel MOSFET.

11. The voltage converter of claim 10, wherein said first parasitic bipolar junction transistor is a pnp bipolar transistor.

12. The voltage converter of claim 11, wherein said second parasitic bipolar junction transistor is an npn bipolar transistor.

13. The voltage converter of claim 12, wherein said first parasitic bipolar junction transistor comprises a drain of said p-channel MOSFET, an n-well and a p-diffusion.

14. The voltage converter of claim 13, wherein said second bipolar junction transistor comprises a drain of said n-channel MOSFET, a p-substrate, and an n-channel diffusion.

15. The voltage converter of claim 12, wherein a first auxiliary p-channel MOSFET comprises said first parasitic bipolar junction transistor within said first auxiliary p-channel MOSFET, the first auxiliary p-channel MOSFET comprises a drain of said first p-channel MOSFET.

16. The voltage converter of claim 15, wherein a first auxiliary n-channel MOSFET comprises said second bipolar transistor within said first auxiliary n-channel MOSFET, the first auxiliary n-channel MOSFET comprises a drain of said first n-channel MOSFET.

17. A method of adaptive threshold control for a zero-cross comparator comprising the steps:
providing a buck converter comprising a high-side MOSFET switch with a first parasitic bipolar transistor, wherein a collector of the first parasitic bipolar transistor is directly connected to a second terminal of a sense capacitive element, a low-side MOSFET switch with a second parasitic bipolar transistor, a sense capacitive element, wherein a collector of the second parasitic bipolar transistor is directly connected to the second terminal of the sense capacitive element, the zero-cross comparator, an offset adjustment feedback loop, a control block, an inductor, and an output capacitor;
sensing a first sense signal from said first parasitic bipolar transistor depending from a current flowing through the first parasitic bipolar transistor to the zero-cross comparator via said sense capacitive element;
sensing a second sense signal from said second parasitic bipolar transistor depending from a current flowing through the second parasitic bipolar transistor to the zero-cross comparator via said sense capacitive element;
storing a combination of the first signal and the second signal on said sense capacitive element;
providing the combination of the first and the second sense signal to said offset adjustment feedback loop;
adjusting a zero-cross comparator response depending on said combination of the first and said second sense signals;
generating an output signal from said zero-cross comparator to said control block.

18. The method of claim 17, wherein said high-side MOSFET switch is a p-channel MOSFET.

19. The method of claim 18, wherein said low-side MOSFET is an n-channel MOSFET.

20. The method of claim 19, wherein said first parasitic bipolar transistor is a pnp bipolar junction transistor.

21. The method of claim 20, wherein said second parasitic bipolar transistor is a npn bipolar junction transistor.

22. The method of claim 21, wherein said second parasitic bipolar transistor is an isolated npn bipolar junction transistor.

23. The method of claim 18, wherein a first auxiliary p-channel MOSFET comprises said first parasitic bipolar transistor within said first auxiliary p-channel MOSFET.

24. The method of claim 18, wherein said high-side MOSFET switch is an isolated p-channel MOSFET.

25. The method of claim 19, wherein a first auxiliary n-channel MOSFET comprises said second parasitic bipolar transistor within said first auxiliary n-channel MOSFET.

26. The method of claim 19, wherein said low-side MOSFET switch is an isolated n-channel MOSFET.

27. The method of claim 20, wherein an isolated p-channel MOSFET comprises said first parasitic bipolar transistor within said isolated p-channel MOSFET.

* * * * *